US 6,510,438 B2

(12) United States Patent
Hasegawa

(10) Patent No.: US 6,510,438 B2
(45) Date of Patent: *Jan. 21, 2003

(54) ELECTRONIC MAIL SYSTEM, METHOD OF SENDING AND RECEIVING ELECTRONIC MAIL, AND STORAGE MEDIUM

(75) Inventor: Yutaka Hasegawa, Hamamatsu (JP)

(73) Assignee: Yamaha Corporation, Hamamatsu (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/467,302

(22) Filed: Dec. 17, 1999

(65) Prior Publication Data

US 2002/0178137 A1 Nov. 28, 2002

Related U.S. Application Data

(63) Continuation-in-part of application No. 09/179,519, filed on Oct. 27, 1998, now abandoned.

(30) Foreign Application Priority Data

Oct. 31, 1997 (JP) .............................................. 9-315931

(51) Int. Cl.⁷ .............................................. G06F 17/30
(52) U.S. Cl. .................................... 707/104.1; 709/207
(58) Field of Search .................. 707/1–6, 10, 100–102, 707/104.1; 709/200–207

(56) References Cited

U.S. PATENT DOCUMENTS 5,520,544 A * 5/1996 Manico et al. ............... 434/317
5,568,383 A * 10/1996 Johnson et al. ................ 704/2

(List continued on next page.)

FOREIGN PATENT DOCUMENTS

EP 0 531 670 3/1993
EP 0 593 384 4/1994

(List continued on next page.)

OTHER PUBLICATIONS

Tooru Sawamura, "Facilities Which Have Not Been Known Until Now! Fun! Master E-mails 100%", PC FAN, Mainichi Communications, Inc., 4th Volume, No. 18, Oct. 15, 1997, pp 64–67 (with English translation).
Takashi Amada, "It is Music With a Computer! (6)", I/O, Kougakusha Inc., Sep. 1, 1997, 22nd Volume, No. 9, pp. 152–155 (no translation).

(List continued on next page.)

Primary Examiner—Maria N. Von Buhr
(74) Attorney, Agent, or Firm—Morrison & Foerster LLP

(57) ABSTRACT

An electronic mail system including a communication line, and at least one transmitting terminal, at least one receiving terminal, and at least one communication terminal connected to each other through the communication line, the communication terminal receiving, through the communication line, an electronic mail sent by the transmitting terminal and transferring the received electronic mail to the receiving terminal corresponding to an address of the electronic mail. The transmitting terminal attaches song data comprising musical tone control information, to the electronic mail, and transmits the electronic mail with the song data attached, to the communication terminal, which in turn, stores the received electronic mail in a storage device, notifies the receiving terminal of receipt of the electronic mail, and retrieves the electronic mail and the song data attached to the mail from the storage device, and transfers them to the receiving terminal, when the receiving terminal requests receipt of the electronic mail in response to notification by said notifying device. The receiving terminal opens the received electronic mail, and automatically reproduces the song data attached to the electronic mail.

18 Claims, 8 Drawing Sheets

U.S. PATENT DOCUMENTS

| | | | |
|---|---|---|---|
| 5,675,100 A | 10/1997 | Hewlett | 84/462 |
| 5,699,089 A * | 12/1997 | Murray | 345/823 |
| 5,714,943 A * | 2/1998 | Rasor | 340/825.44 |
| 5,771,353 A * | 6/1998 | Eggleston et al. | 709/227 |
| 5,815,553 A * | 9/1998 | Baugh et al. | 379/88.17 |
| 5,835,061 A * | 11/1998 | Stewart | 342/457 |
| 5,838,996 A * | 11/1998 | deCarmo | 710/68 |
| 5,867,281 A * | 2/1999 | Nozoe et al. | 358/402 |
| 5,872,926 A * | 2/1999 | Levac et al. | 709/206 |
| 5,978,836 A * | 11/1999 | Ouchi | 709/206 |
| 6,034,970 A * | 3/2000 | Levac et al. | 370/466 |
| 6,108,329 A * | 8/2000 | Oyama et al. | 370/352 |
| 6,252,588 B1 * | 6/2001 | Dawson | 345/752 |
| 6,259,444 B1 * | 7/2001 | Palmer et al. | 345/866 |
| 6,259,891 B1 * | 7/2001 | Allen | 455/3.02 |

FOREIGN PATENT DOCUMENTS

| | | |
|---|---|---|
| JP | 04-205400 | 7/1992 |
| JP | 05-068053 | 3/1993 |
| JP | 06-195277 | 7/1994 |
| JP | 07-073122 | 3/1995 |
| JP | 07-143165 | 6/1995 |
| JP | 08-110785 | 4/1996 |
| JP | 08-180003 | 7/1996 |
| JP | 09-101777 | 4/1997 |
| JP | 10-283280 | 10/1998 |

OTHER PUBLICATIONS

W. Keith Edwards, The Design and Implementation of the MONTAGE Multimedia Mail System, IEEE Conference, Apr. 18–19, 1991, pp. 47–57.

"EUDORA PRO" (Japanese version), Kuni Research International Corp., Apr. 20, 1996, Section 3.19, pp. 98–100, partial translation.

* cited by examiner

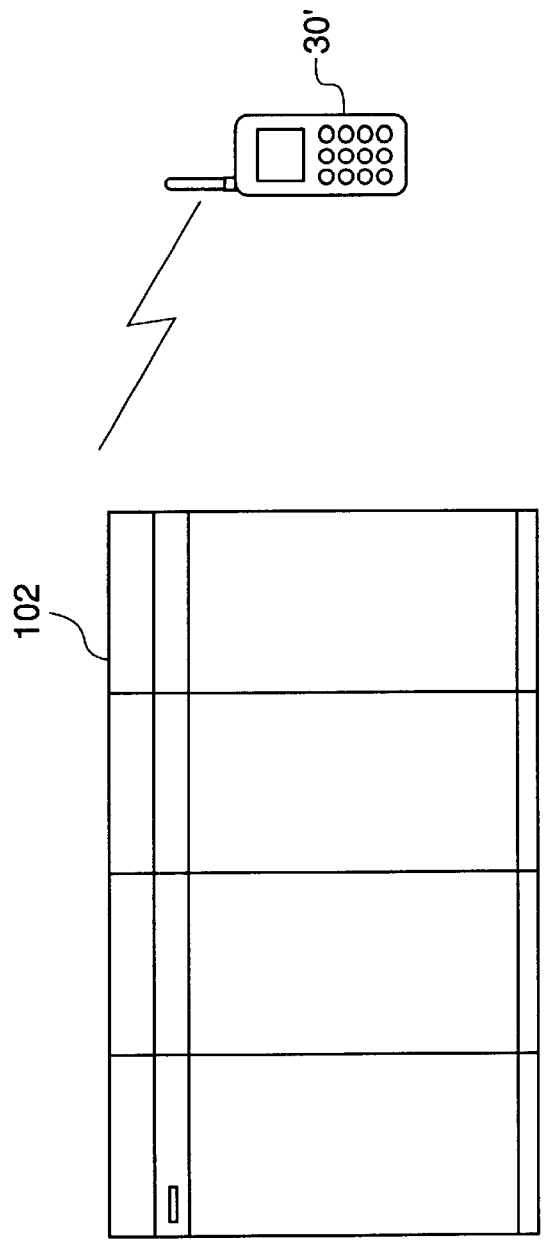
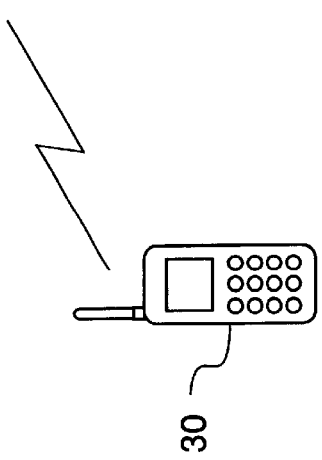
FIG.6

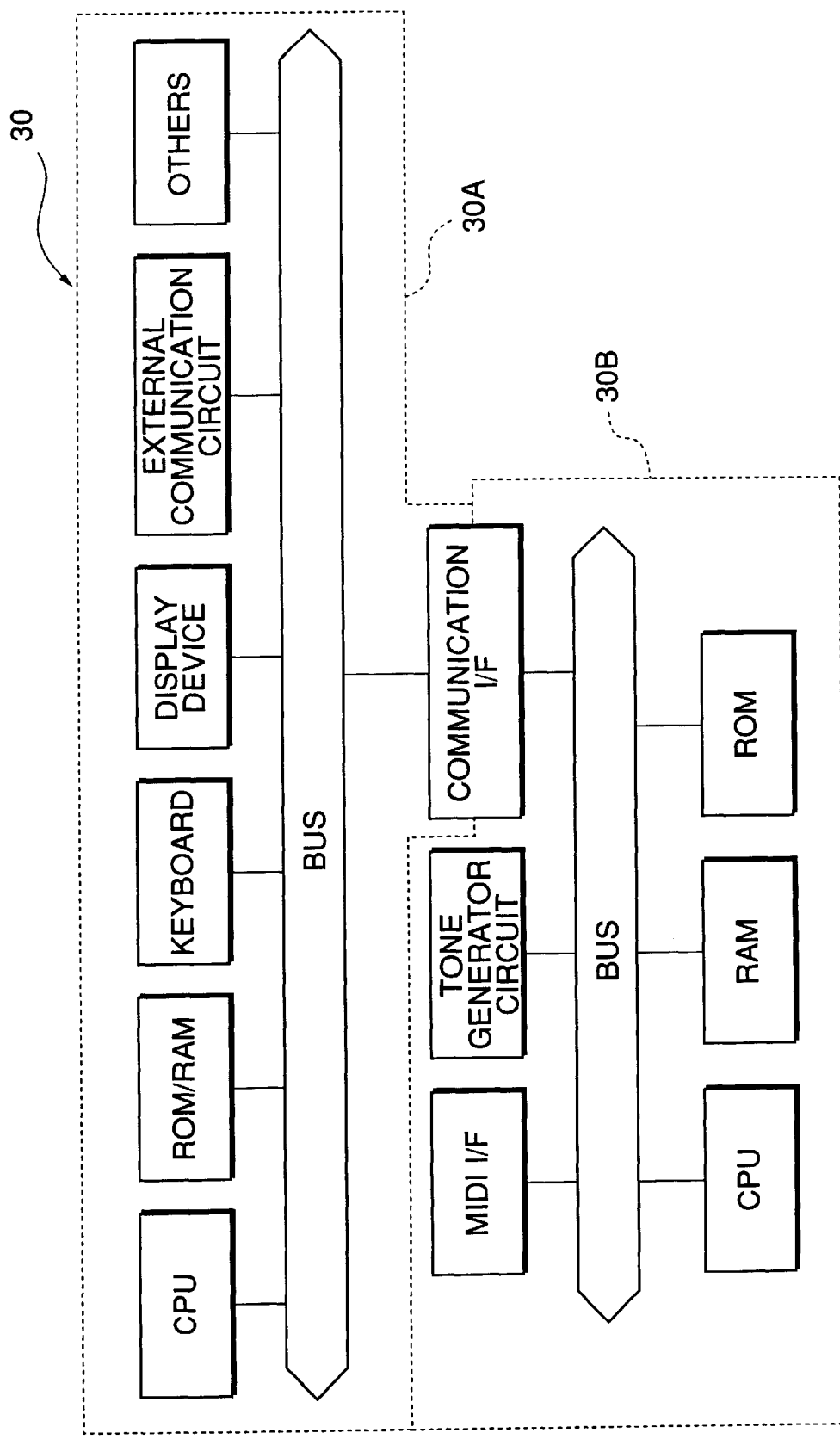

ELECTRONIC MAIL SYSTEM, METHOD OF SENDING AND RECEIVING ELECTRONIC MAIL, AND STORAGE MEDIUM

CROSS-REFERENCE TO RELATED APPLICATION

The present invention is a continuation-in-part of U.S. application Ser. No. 09/179,519 filed Oct. 27, 1998 for ELECTRONIC MAIL SYSTEM, METHOD OF SENDING AND RECEIVING ELECTRONIC MAIL, AND STORAGE MEDIUM now abandoned. The disclosure of that application is specifically incorporated herein by reference.

BACKGROUND OF THE INVENTION

1. Field of the Invention

The present invention relates to an electronic mail system that sends and receives electronic mails to which musical tone control information is attached, a method of sending and receiving such electronic mails, and a storage medium that stores a program for sending and receiving the electronic mails.

2. Prior Art

Conventionally, in order to send and receive musical sound or voice with an electronic mail, voice data produced by converting a voice signal representing the voice or sound into digital data has been used as an attached file to the electronic mail.

In the known electronic mail system as described above, however, the attached file is formed of voice data that contains a large quantity or volume of data, and therefore it takes a long time to send and receive an electronic mail to which such a file is attached. In particular, when a relatively low-speed modem is used, or a communication line is busy, it is undesirable to send or receive the electronic mail with the attached file containing voice data, because the communication line is kept occupied over a long period of time.

SUMMARY OF THE INVENTION

It is the object of the invention to provide an electronic mail system which is capable of sending and receiving an electronic mail along with high-quality, small-quantity musical tone or voice data, a method of sending and receiving such an electronic mail, and a storage medium that stores a program for sending and receiving such an electronic mail.

To attain the object, according to a first aspect of the present invention, there is provided a receiving terminal connected to a communication line, for receiving, through the communication line, an electronic mail that is sent by a transmitting terminal connected to the communication line, comprising a receiving device that receives the electronic mail which is sent by the transmitting terminal, and to which song data comprising musical tone control information is attached, an opening device that opens the received electronic mail, and a reproducing device that automatically reproduces the song data attached to the electronic mail when the electronic mail is opened by the opening device.

Preferably, the song data comprising musical tone control information is MIDI data.

According to the first aspect, there is also provided a receiving terminal control method of controlling a receiving terminal connected to a communication line, for receiving, through the communication line, an electronic mail sent by a transmitting terminal connected to the communication line, comprising the steps of receiving the electronic mail which is sent by the transmitting terminal, and to which song data comprising musical tone control information is attached, opening the electronic mail, and automatically reproducing the song data attached to the electronic mail when the electronic mail is opened.

According to the first aspect, there is also provided a storage medium that stores commands readable by a machine, the commands causing the machine to execute a receiving terminal control module for controlling a receiving terminal connected to a communication line, for receiving, through the communication line, an electronic mail that is sent by a transmitting terminal connected to the communication line, the receiving terminal control module comprising a module that receives the electronic mail which is sent by the transmitting terminal, and to which song data comprising musical tone control information is attached, a module that opens the received electronic mail; and a module that automatically reproduces the song data attached to the electronic mail when the electronic mail is opened.

According to the first aspect as defined above, the receiving terminal receives the electronic mail sent by the transmitting terminal, along with song data comprising musical tone control information attached to the mail, the song data attached to the electronic mail is automatically reproduced when the electronic mail is opened. Therefore, since the song data comprising musical tone control information is attached to the electronic mail and sent to the receiving terminal, high-quality musical tone or voice represented by a small quantity of data can be transmitted and received along with the electronic mail. Further, upon opening of the electronic mail, the user need not open the attached file containing song data, and start an appropriate application for reproducing the song data in the opened file, thus assuring improved efficiency with which the user operates the receiving terminal.

A typical example of the musical tone control information is MIDI (Musical Instrument Digital Interface) data. The musical tone control information, however, is not limited to MIDI data, but may be any type of data whose quantity or volume is smaller than that of the original musical tone or voice, and which enables high-quality musical tone or voice to be reproduced.

The term "electronic mail" used in the appended claims means not only character data, but may also include image or picture data and/or a small quantity of voice data produced by converting a voice signal into digital data, in addition to the character data.

To attain the object, according to a second aspect of the present invention, there is provided a communication terminal connected to a communication line, for receiving, through the communication line, an electronic mail sent by a transmitting terminal connected to the communication line, and transferring the received electronic mail to a receiving terminal connected to the communication line and corresponding to an address of the electronic mail, comprising a receiving device that receives, from the transmitting terminal, the electronic mail to which song data comprising musical tone control information is attached, a storage device that stores the received electronic mail to which the song data is attached, a notifying device that notifies the receiving terminal of receipt of the electronic mail when receiving the electronic mail from the transmitting terminal, and a transfer device that retrieves the electronic mail and the song data attached to the mail from the storage device, and transfers the electronic mail and the song data to the receiving terminal, when the receiving terminal requests receipt of the electronic mail in response to notification by the notifying device.

According to the second aspect, there is also provided a communication terminal control method of controlling a communication terminal connected to a communication line, for receiving, through the communication line, an electronic mail sent by a transmitting terminal connected to the communication line, and transfers the received electronic mail to a receiving terminal connected to the communication line and corresponding to an address of the electronic mail, comprising the steps of receiving, from the transmitting terminal, the electronic mail to which song data comprising musical tone control information is attached, storing the received electronic mail to which the song data is attached in a storage device, notifying the receiving terminal of receipt of the electronic mail when receiving the electronic mail from the transmitting terminal, and retrieving the electronic mail and the song data attached to the mail from the storage device, and transferring the electronic mail and the song data to the receiving terminal, when the receiving terminal requests receipt of the electronic mail in response to notification by the communication terminal.

According to the second aspect, there is further provided a storage medium that stores commands readable by a machine, the commands causing the machine to execute a communication terminal control module for controlling a communication terminal connected to a communication line, for receiving, through the communication line, an electronic mail that is sent by a transmitting terminal connected to the communication line, and transfers the received electronic mail to a receiving terminal connected to the communication line and corresponding to an address of the electronic mail, the communication terminal control module comprising a module that receives, from the transmitting terminal, the electronic mail to which song data comprising musical tone control information is attached, a module that stores the received electronic mail to which the song data is attached, in a storage device, a module that notifies the receiving terminal of receipt of the electronic mail when the communication terminal receives the electronic mail from the transmitting terminal, and a module that retrieves the electronic mail and the song data attached to the mail from the storage device, and transfers the electronic mail and the song data to the receiving terminal, when the receiving terminal requests receipt of the electronic mail in response to notification by the communication terminal.

According to the second aspect as defined above, the communication terminal receives the electronic mail to which song data comprising musical tone control information is attached, from the transmitting terminal, and transfers the electronic mail to the receiving terminal. Thus, the transmitting terminal need not directly deliver the electronic mail to which song data is attached, to the receiving terminal, and therefore the function of the transmitting terminal may be simplified. Further, since the song data comprising musical tone control information is attached to the electronic mail and sent to the receiving terminal, high-quality musical tone or voice represented by a small quantity of data can be transmitted and received along with the electronic mail.

To attain the object, according to a third aspect of the invention, there is provided a transmitting terminal connected to a communication line, for receiving, through the communication line, an electronic mail sent by a transmitting terminal connected to the communication line, and transferring the received electronic mail to a receiving terminal connected to the communication line and corresponding to an address of the electronic mail, comprising a first storage device that stores a plurality of kinds of ornamental data that ornament the electronic mail sent by the transmitting terminal, and a plurality of kinds of song data attached to the electronic mail and comprising musical tone control information, a presenting device that presents the plurality of kinds of ornamental data and the plurality of kinds of song data stored in the first storage device, to the transmitting terminal, so that the transmitting terminal can select a combination of ornamental data and song data from the plurality of kinds of ornamental data and song data, and designate the combination as electronic mail data, a second storage device that retrieves the electronic mail data from the first storage device and stores the retrieved data, when the transmitting terminal requests the communication terminal to send the combination of ornamental data and song data selected and designated as the electronic mail data, to the receiving terminal, a notifying device that notifies the receiving terminal of receipt of the electronic mail when the electronic mail data is stored in the second storage device in response to the request from the transmitting terminal for sending the electronic mail, and a transfer device that retrieves the electronic mail data from the second storage device, and transfers the data to the receiving terminal, when the receiving terminal requests receipt of the electronic mail in response to notification by the notifying device.

Preferably, the plurality of kinds of song data comprising musical tone control information are MIDI data.

According to the third aspect, there is also provided a communication terminal control method of controlling a communication terminal connected to a communication line, for receiving, through the communication line, an electronic mail sent by a transmitting terminal connected to the communication line, and transfers the received electronic mail to a receiving terminal connected to the communication line and corresponding to an address of the electronic mail, comprising the steps of storing a plurality of kinds of ornamental data that ornament the electronic mail sent by the transmitting terminal, and a plurality of kinds of song data attached to the electronic mail and comprising musical tone control information, in a first storage device, presenting the plurality of kinds of ornamental data and the plurality of kinds of song data stored in the first storage device, to the transmitting terminal, so that the transmitting terminal can select a combination of ornamental data and song data from the plurality of kinds of ornamental data and song data, and designate the combination as electronic mail data, retrieving the electronic mail data from the first storage device and storing the retrieved data in a second storage device, when the transmitting terminals requests the communication terminal to send the combination of ornamental data and song data selected and designated as the electronic mail data, to the receiving terminal, notifying the receiving terminal of receipt of the electronic mail when the electronic mail data is stored in the second storage device in response to the request from the transmitting terminal for sending the electronic mail, and retrieving the electronic mail data from the second storage device, and transferring the retrieved data to the receiving terminal, when the receiving terminal requests receipt of the electronic mail in response to notification by the communication terminal.

According to the third aspect, there is further provided a storage medium that stores commands readable by a machine, the commands causing the machine to execute a communication terminal control module for controlling a communication terminal connected to a communication line, for receiving, through the communication line, an electronic mail that is sent by a transmitting terminal connected to the communication line, and transfers the received electronic mail to a receiving terminal connected to the communication line and corresponding to an address of the electronic mail, the communication terminal control module comprising a module that stores a plurality of kinds of ornamental data that ornament the electronic mail sent by the transmitting terminal, and a plurality of kinds of song data attached to the electronic mail and comprising musical tone control information, in a first storage device, a module that presents the plurality of kinds of ornamental data and the plurality of kinds of song data stored in the first storage device, to the transmitting terminal, so that the transmitting terminal can select a combination of ornamental data and song data from the plurality of kinds of ornamental data and song data, and designate the combination as electronic mail data, a module that retrieves the electronic mail data from the first storage device and stores the retrieved data in a second storage device, when the transmitting terminals requests the communication terminal to send the combination of ornamental data and song data selected and designated as the electronic mail data, to the receiving terminal, a module that notifies the receiving terminal of receipt of the electronic mail when the electronic mail data is stored in the second storage device in response to the request from the transmitting terminal for sending the electronic mail, and a module that retrieves the electronic mail data from the second storage device, and transfers the retrieved data to the receiving terminal, when the receiving terminal requests receipt of the electronic mail in response to notification by the communication terminal.

According to the third aspect as defined above, the plural kinds of ornamental data and song data stored in the first memory device are presented to the user on the side of the transmitting terminal, so that the user can select a desired combination of ornamental data and song data, and designate it as electronic mail data. The communication terminal then delivers the electronic mail data, i.e., the selected combination of ornamental and song data, to the receiving terminal. With this arrangement, the user of the transmitting terminal need not prepare electronic mail data from scratch, and the number of procedures to be taken by the user can be thus reduced. Also, since the song data comprising musical tone control information is attached to the electronic mail and sent to the receiving terminal, high-quality musical tone or voice represented by a small quantity of data can be transmitted and received along with the electronic mail.

To attain the object, according to a fourth aspect of the invention, there is provided an electronic mail system including a communication line, and at least one transmitting terminal and at least one receiving terminal connected to each other through the communication line, the transmitting terminal sending an electronic mail to the receiving terminal corresponding to an address of the electronic mail through the communication line, wherein the transmitting terminal comprises an attaching device that attaches song data comprising musical tone control information, to the electronic mail, and a transmitting device that transmits the electronic mail to which the song data is attached, to the receiving terminal, and the receiving terminal comprises a receiving device that receives the electronic mail which is sent by the transmitting terminal, and to which the song data comprising musical tone control information is attached, an opening device that opens the received electronic mail, and a reproducing device that automatically reproduces the song data attached to the electronic mail when the electronic mail is opened by the opening device.

To attain the object, according to a fifth aspect of the invention, there is provided an electronic mail system including a communication line, and at least one transmitting terminal, at least one receiving terminal, and at least one communication terminal connected to each other through the communication line, the communication terminal receiving, through the communication line, an electronic mail sent by the transmitting terminal and transferring the received electronic mail to the receiving terminal corresponding to an address of the electronic mail, wherein the transmitting terminal comprises an attaching device that attaches song data comprising musical tone control information, to the electronic mail, and a transmitting device that transmits the electronic mail to which the song data is attached, to the communication terminal, the communication terminal comprises a first receiving device that receives, from the transmitting terminal, the electronic mail to which the song data comprising musical tone control information is attached, a storage device that stores the received electronic mail to which the song data is attached, a notifying device that notifies the receiving terminal of receipt of the electronic mail when receiving the electronic mail from the transmitting terminal, and a transfer device that retrieves the electronic mail and the song data attached to the mail from the storage device, and transfers the electronic mail and the song data to the receiving terminal, when the receiving terminal requests receipt of the electronic mail in response to notification by the notifying device, and the receiving terminal comprises a second receiving device that receives the electronic mail which is transferred from the communication terminal, and to which the song data comprising musical tone control information is attached, an opening device that opens the received electronic mail, and a reproducing device that automatically reproduces the song data attached to the electronic mail when the electronic mail is opened by the opening device.

To attain the object, according to a sixth aspect of the invention, there is provided an electronic mail system including a communication line, and at least one transmitting terminal, at least one receiving terminal, and at least one communication terminal connected to each other through the communication line, the communication terminal receiving, through the communication line, an electronic mail sent by the transmitting terminal and transferring the received electronic mail to the receiving terminal corresponding to an address of the electronic mail, wherein the transmitting terminal comprises a transmitting device that transmits a request for delivery of the electronic mail to the receiving terminal corresponding to the address of the electronic mail, to the communication terminal, the communication terminal comprises a first storage device that stores a plurality of kinds of ornamental data that ornament the electronic mail sent by the transmitting terminal, and a plurality of kinds of song data attached to the electronic mail and comprising musical tone control information, a presenting device that, in response to the request for delivery of the electronic mail from the transmitting terminal, presents the plurality of kinds of ornamental data and the plurality of kinds of song data stored in the first storage device, to the transmitting terminal, so that the transmitting terminal can select a combination of ornamental data and song data from the plurality of kinds of ornamental data and song data, and designate the combination as electronic mail data, a second storage device that retrieves the electronic mail data from the first storage device and stores the retrieved data, when the transmitting terminal requests the communication terminal to send the combination of ornamental data and song data selected and designated as the electronic mail data, to the receiving terminal, a notifying device that notifies the receiving terminal of receipt of the electronic mail when the electronic mail data is stored in the second storage device in response to the request from the transmitting terminal for sending the electronic mail, and a transfer device that retrieves the electronic mail data from the second storage device, and transfers the data to the receiving terminal, when the receiving terminal requests receipt of the electronic mail in response to notification by the notifying device, and the receiving terminal comprises a receiving device that receives the electronic mail which is transferred from the communication terminal, and to which the song data comprising musical tone control information is attached, an opening device that opens the received electronic mail, and a reproducing device that automatically reproduces the song data attached to the electronic mail when the electronic mail is opened by the opening device.

The transmitting terminal and the receiving terminal according to the present invention may each comprise one of a general purpose computer, a portable communication terminal of a wireless communication type, and a portable communication terminal of a wire communication type.

The above and other objects, features and advantages of the invention will become more apparent from the following detailed description taken in conjunction with the accompanying drawings.

BRIEF DESCRIPTION OF THE DRAWINGS

FIG. 6 is a schematic view showing the construction of an electronic mail system according to a third embodiment of the invention;

FIG. 7 is a block diagram schematically showing the construction of one of two portable communication terminals appearing in FIG. 6;

DETAILED DESCRIPTION OF PREFERRED EMBODIMENTS

The invention will NOW be described in detail with reference to the drawings showing preferred embodiments thereof.

An electronic mail system according to a first embodiment of the invention is comprised of a transmitting terminal that sends an electronic mail, a server computer (communication terminal) that stores the electronic mail sent by the transmitting terminal in a storage device, and delivers the mail to an addressee of the mail, and a receiving terminal as the addressee that receives the electronic mail delivered by the server computer. Each of these components, i.e., the transmitting and receiving terminals and server computer, may be formed by a general purpose computer, such as a personal computer or a work station. Needless to say, the functions of the transmitting terminal and receiving terminal are not fixedly determined, but may be changed or switched as desired. For example, the receiving terminal may serve as a transmitting terminal when it sends out an electronic mail.

Figure 1:
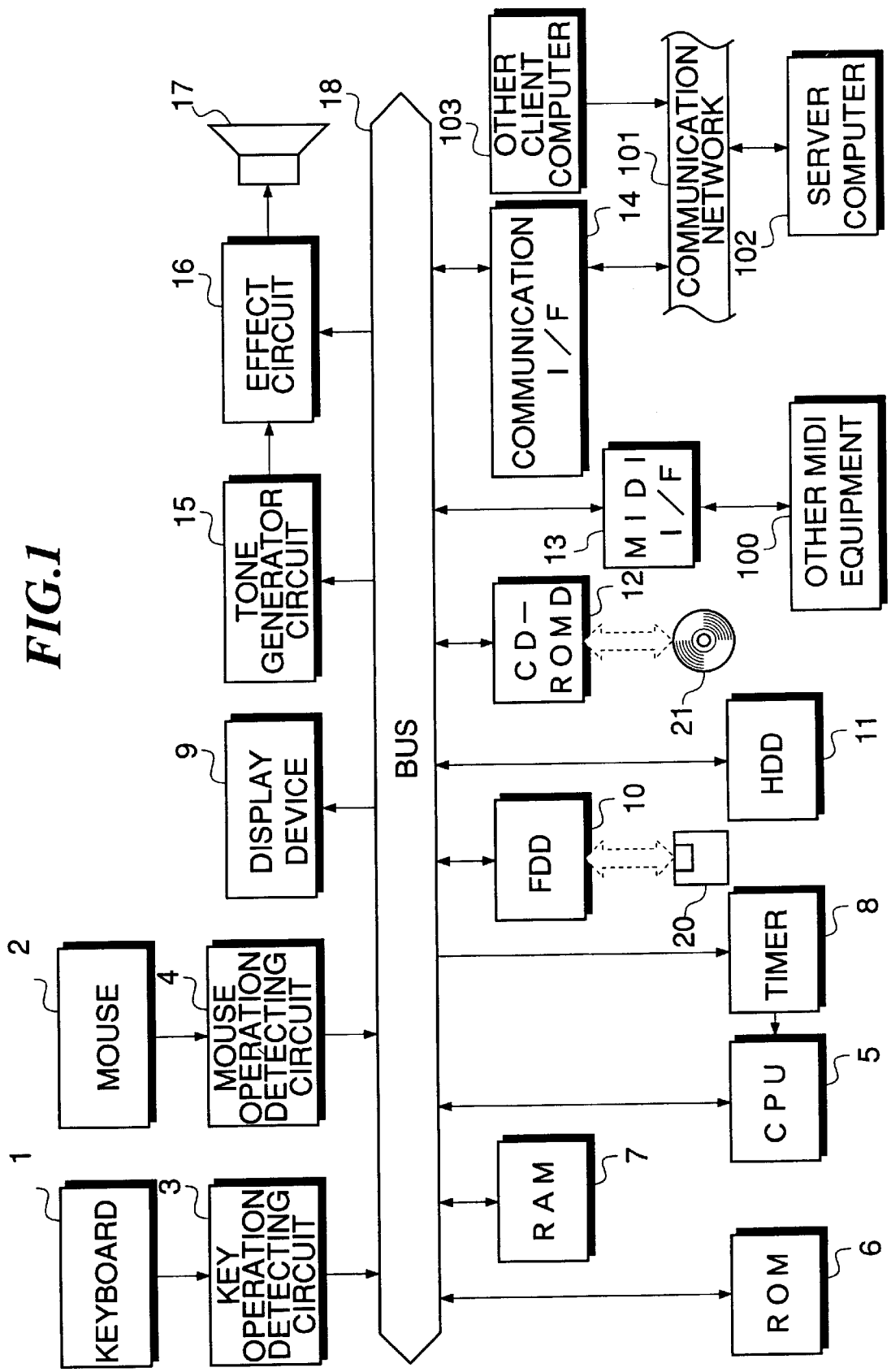
FIG. 1 is a block diagram schematically showing the construction of a transmitting terminal that constitutes an electronic mail system according to a first embodiment of the invention.

FIG. 1 schematically shows the construction of the transmitting terminal, namely, general purpose computer, that constitutes the electronic mail system of the present embodiment.

As shown in FIG. 1, the transmitting terminal of the present embodiment includes a keyboard 1 mainly used for entering character information, a mouse 2 serving as a pointing device, a key operation detecting circuit 3 that detects an operated state of each key on the keyboard 1, and a mouse operation detecting circuit 4 that detects an operated state of the mouse 2. The transmitting terminal also includes a CPU 5 that governs control of the whole apparatus, a ROM 6 that stores control programs to be executed by the CPU 5, table data, and so forth, a RAM 7 that temporarily stores performance data, various input information, results of computation, and others, a timer 8 that counts interrupt time for timer interrupt processing, and various sorts of time or durations, and a display device 9 that displays various information, and includes, for example, a large-sized liquid crystal display (LCD) or a CRT (cathode ray tube) display, and light emitting diodes (LED). The transmitting terminal further includes a floppy disc drive (FDD) 10 for driving a floppy disc (FD) 20 as one type of storage medium, a hard disc drive (HDD) 11 for driving a hard disc (not shown) that stores various application programs including the above-indicated control programs, various data, and so on, a CD-ROM drive (CD-ROMD) 12 for driving a compact disc read-only memory (CD-ROM) 21 that stores various application programs including the control programs, various data, and so on. In the transmitting terminal are also included a MIDI interface (I/F) 13 that receives MIDI signals from the outside of the computer (external apparatus), and generates or outputs MIDI signals to the outside, a communication interface (I/F) 14 that sends and receives data to and from a server computer 102 or other client computer (receiving terminal in this embodiment) 103, a tone generator circuit 15 that converts performance data entered through the MIDI I/F 13 or communication I/F 14, or preset performance data, into musical tone signals, an effect circuit 16 that gives various effects to the musical tone signals received from the tone generator circuit 15, and a sound system 17 composed of a DAC (digital-to-analog converter), an amplifier, a sound speaker, etc. that converts the musical tone signals received from the effect circuit 16, into sound.

The component elements 3-16 described above are connected to each other through a bus 18, and the timer 8 is connected to the CPU 5. Also, other MIDI equipment 100 is connected to the MIDI I/F 13, and a communication network 101 is connected to the communication I/F 14. Further, the effect circuit 16 is connected to the tone generator circuit 15, and the sound system 17 is connected to the effect circuit 16.

The hard disc mounted in the hard disc drive (HDD) 11 is able to store control programs to be executed by the CPU 5, as described above. Where a desired control program is not stored in the ROM 6, the control program is stored in the hard disc, and the RAM 7 reads the control program so as to cause the CPU 5 to perform substantially the same operations as in the case where the control program is stored in the ROM 6. This arrangement makes it easy to add new control programs, and upgrade versions of the programs.

Control programs and various data read from the CD-ROM 21 in the CD-ROM drive 12 are stored in the hard disc of the HDD 11. This arrangement makes it easy to install new control programs and upgrade versions of the programs. Various types of external storage devices, other than the CD-ROM drive 12, that use various forms of media may also be provided. One example of such storage devices is a magneto-optical disc (MO) device.

As described above, the communication I/F 14 is connected to the communication network 101, which may be a LAN (local are network), Internet, and a telephone line, for example, to be connected to the server computer 102 or other client computer 103, through the communication network 101. Where a certain program or certain type of parameters are not stored in the hard disk within the HDD 11, the communication I/F 14 is used to download the program or parameters from the server computer 102. A client computer (i.e., transmitting terminal and receiving terminal in the present embodiment) sends a command to the server computer 102 through the communication I/F 14 and communication network 101, to request downloading of the desired program or parameters. Upon receipt of the command, the server computer 102 delivers the requested program or parameters to the client computer via the communication network 101, and the client computer receives the program or parameters via the communication I/F 14, and stores the same in the hard disc within the HDD 11, whereby downloading is completed.

In addition, the computer as described above may be provided with an interface through which data are directly transmitted and received to and from an external computer, or the like.

While the electronic mail system of the present embodiment uses only one server computer 102, which is connected to the transmitting terminal and the receiving terminal, the system may include a plurality of serve computers. For example, if two server computers are used, the system may be constructed such that the transmitting terminal is connected to one of the server computers, and the receiving terminal is connected to the other, while these server computers are connected to each other through a network. It is, however, to be understood that the mail system of the present invention is not limited to this arrangement.

The other apparatuses that constitute the electronic mail system of the present invention, namely, the server computer and the receiving terminal, are respectively formed by general purpose computers, as described above, and the hardware arrangements of these computers are almost the same as that of the transmitting terminal as described above. However, the apparatuses constituting the mail system may be constructed differently from each other. For example, since the server computer 102 of the present embodiment mainly functions to receive electronic mail data, store the data in a storage device, and deliver the electronic mail data to the receiving terminal, such elements that have auxiliary functions to generate musical tones, namely, the tone generator circuit 15, effect circuit 16 and sound system 17, may be eliminated from the server computer 102. Where the server computer 102 includes the FDD (floppy disc drive) 10 and CD-ROM drive 12 as described above, the transmitting terminal and receiving terminal as client computers may use the FDD 10 and CD-ROM drive 12 in common, and therefore the FDD 10 and CD-ROM drive 12 need not be provided on the side of the transmitting terminal and the receiving terminal.

Figure 2:
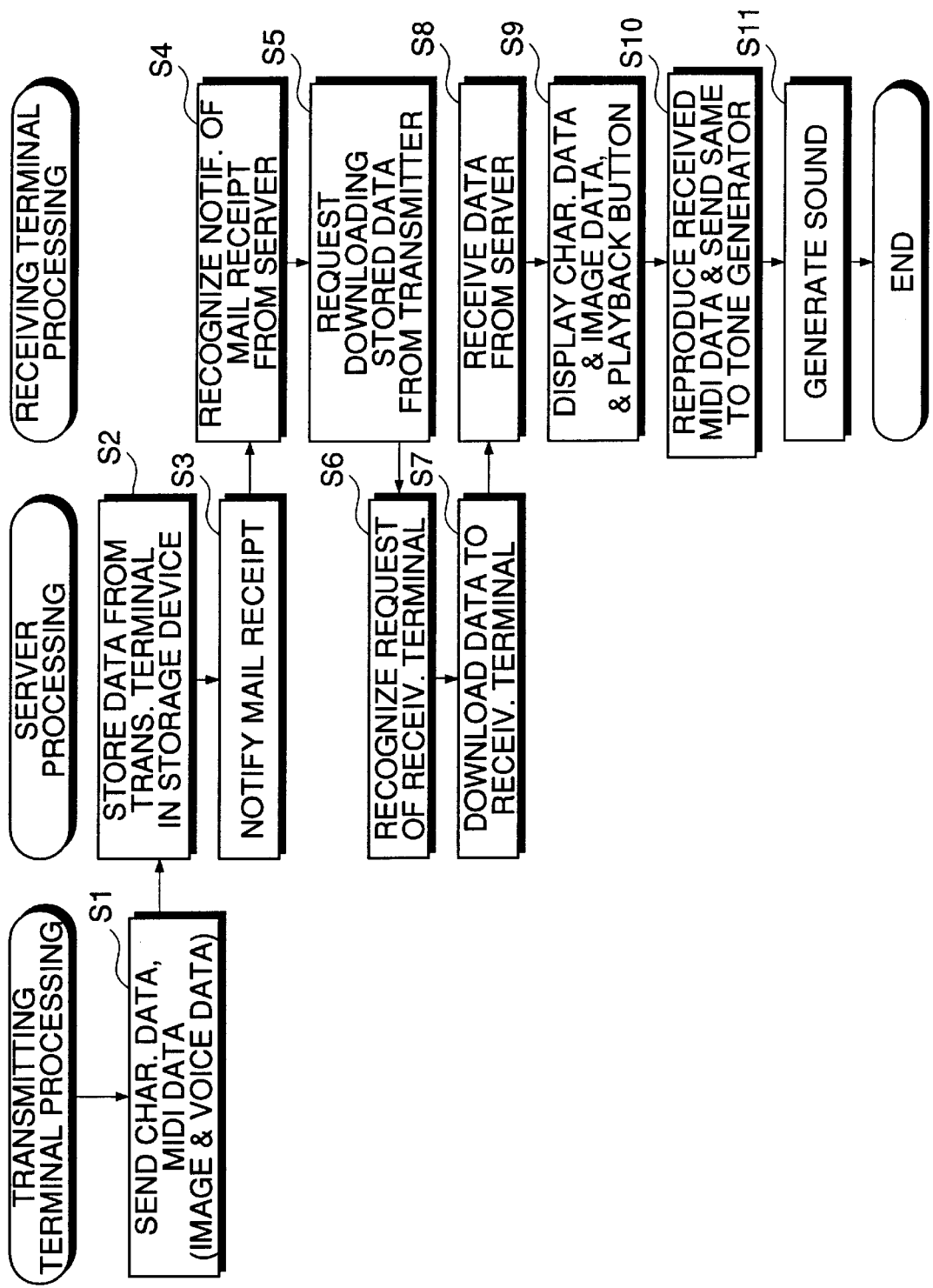
FIG. 2 is a flowchart showing a flow of control operations to be performed by the transmitting terminal, a server computer and a receiving terminal that constitute the electronic mail system of the first embodiment.

Referring next to FIG. 2, there will be described control operations to be performed by the transmitting terminal, server computer 102 and receiving terminal that constitute the electronic mail system constructed as described above.

At a step S1 in FIG. 2, the transmitting terminal transmits, in response to a user's command, an electronic mail to which song data (prepared by the user) formed of musical tone control information is attached, to the receiving terminal, namely, to the address of the server computer 102 to which the receiving terminal belongs. The musical tone control information is typically MIDI data, and so it will be limited to MIDI data in the following description. The song data will also be called "MIDI data" if there is no possibility of confusion. In the present embodiment, the electronic mail data is formed of not only character data (text data), but may also include image data in addition to character data. For example, the electronic mail data is prepared in HTML (hypertext markup language), so that the mail data is formed of character data and image data, and the electronic mail data described in HTML is sent to the receiving terminal. Such a system is well known in the art. It is also possible to attach a small quantity of voice data (that is not MIDI data but data obtained by converting a voice signal into digital data) to the electronic mail. In the following, the electronic mail data means data of an electronic mail to which song data or voice data is attached.

At a step S2, the server computer 102 stores electronic mail data received from the transmitting terminal, in an addressee's mail box provided in a storage device (for example, hard disc in the HDD 11) of the computer 102. At a step S3, the server computer 102 notifies the addressee or receiving terminal of the receipt of the relevant mail.

In response to this, the receiving terminal recognizes the notification of the receipt of the mail from the server computer 102 at a step S4, and sends a command to the server computer 102 to request the electronic mail data that has been stored in the storage device of the server computer 102, to be downloaded into the receiving terminal at a step S5. Namely, the receiving terminal accesses the server computer 102 to retrieve the received mail.

The server computer 102 recognizes the request from the receiving terminal at a step S6, and downloads the electronic mail data under request, to the receiving terminal at a step S7.

The receiving terminal receives the electronic mail data at a step S8, and displays the character data and image data included in the electronic mail data, together with a playback button, on the display device 9 at a step S9. At the same time, the receiving terminal automatically reproduces MIDI data contained in the electronic mail data, and transmits the data to the tone generator circuit 15 at a step S10. At a step S11, the tone generator circuit 15 produces a musical tone signal based on the reproduced data, and transmits the signal to the effect circuit 16, which in turn adds various effects to the musical tone signal thus produced. The sound system 17 receives the resulting musical tone signal from the effect circuit 16, and generates corresponding sound.

In the present embodiment, as described above, when the receiving terminal accesses the server computer 102 to retrieve the electronic mail data, the character data and image data as part of the electronic mail data are displayed on the display device 9, and the MIDI data is reproduced at the same time. With this arrangement, the receiving terminal is able to immediately reproduce musical sound or voice, without requiring the user to start an application program for opening MIDI data as an attached file and reproducing the opened MIDI data. Thus, the user need not operate the computer to perform operations for reproducing the MIDI data, assuring improved efficiency in the use of the computer.

Figure 3:
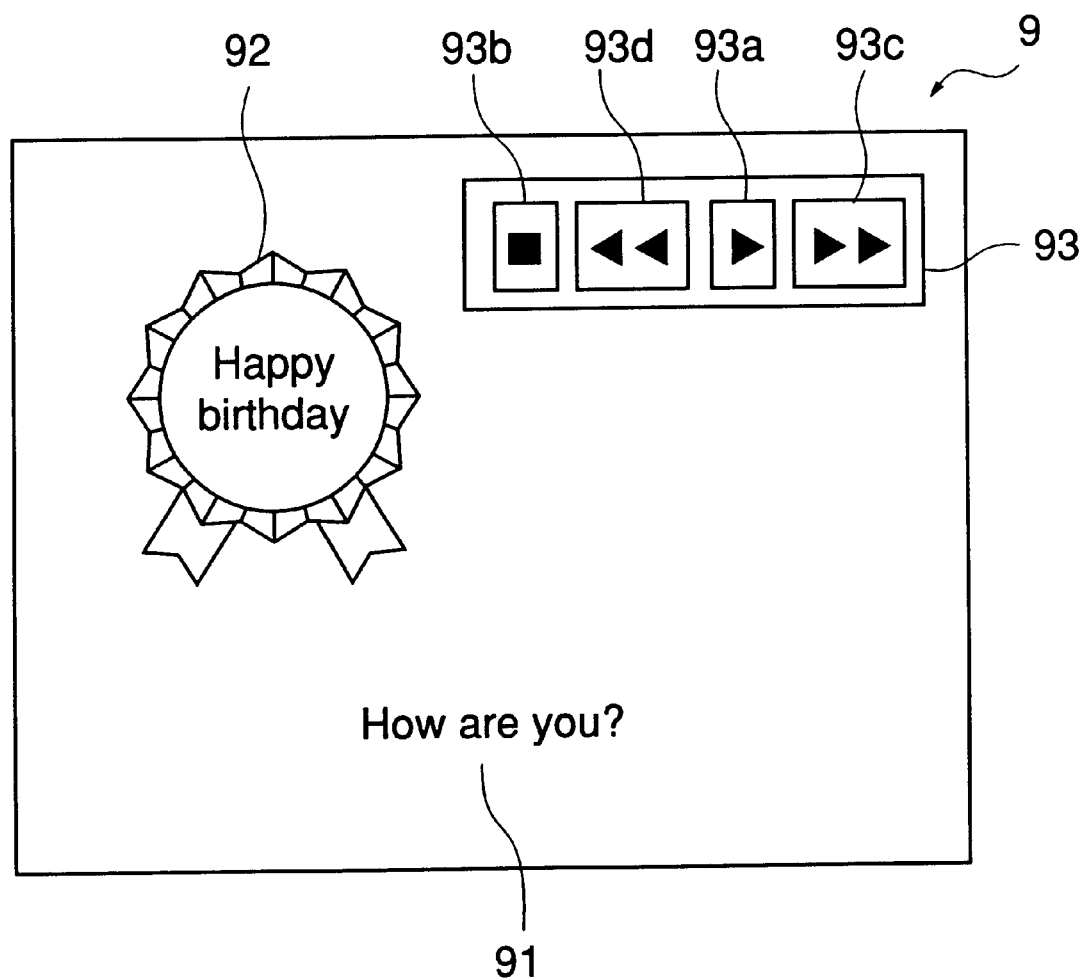
FIG. 3 is a view showing one example of electronic mail data and a playback button displayed at a step S9 of the flowchart of FIG. 2.

FIG. 3 shows one example of electronic mail data and a display control (including the playback button) that are displayed on the display device 9 at the step S9, wherein an electronic mail representing a birthday card is illustrated.

In the example of FIG. 3, a message portion 91 that says "How are you?" is displayed based on character data entered by the user of the transmitting terminal, and an image portion 92 that includes characters "Happy birthday" is displayed based on image data prepared by the user. The user of the receiving terminal is supposed to operate a display console 93 for controlling the playback state or mode of the received MIDI data. The display console 93 is comprised of a playback start button 92 to be pushed to start reproduction of the MIDI data, a stop button 93b for stopping the reproduction, a fast forward button 93c for fast-forwarding the data, and a rewind button 93d for re-winding the data. The buttons 93a-93d are generically called "playback button".

In the present embodiment in which the electronic mail data is displayed on the display device 9, and the MIDI data starts being reproduced at the same time, the user is able to control the manner of playing back the MIDI data as he/she wishes, by manipulating the mouse 2 to push a desired one of the buttons 93a-93d on the display console 93.

In the present embodiment, since song data attached to the electronic mail is formed of MIDI data whose quantity is usually small, high-quality musical sound or voice represented by the small quantity of data can be transmitted and received along with the electronic mail.

Next, an electronic mail system according to a second embodiment of the invention will be described. The electronic mail system of the present embodiment is different from that of the first embodiment only in terms of the control processing of each apparatus that constitutes the electronic mail system, and therefore only the control processing will be described, and the hardware structure of each apparatus will not be explained.

Figure 4:
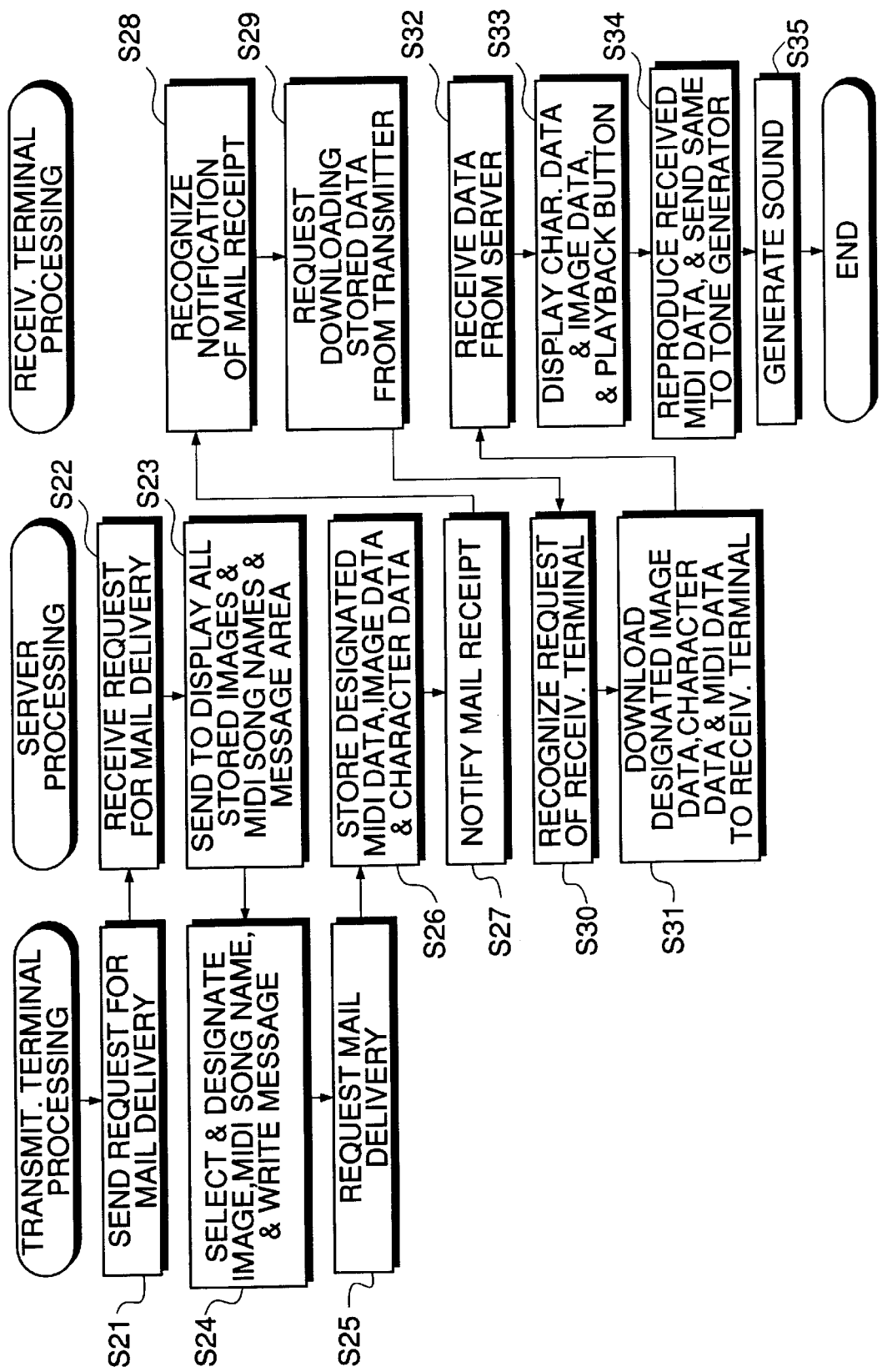
FIG. 4 is a flowchart showing a flow of control operations performed by a transmitting terminal, a server computer, and a receiving terminal that constitute an electronic mail system according to a second embodiment of the invention.

FIG. 4 shows a flow of control operations to be performed by the transmitting terminal, server computer 102, and receiving terminal that constitute the electronic mail system of the present embodiment.

At a step S21 in FIG. 4, the transmitting terminal sends, in response to a command of the user, a request for delivery of an electronic mail, to a server computer (that will be called "connection server") to which the transmitting terminal is connected. The connection server receives the request for mail delivery from the transmitting terminal at a step S22, and sends samples of electronic mail data stored in a storage device (for example, hard disc in the HDD 11) of the connection server, to the transmitting terminal. The samples of electronic mail data may be in the form of image data (reduced images: ornamental data), and data indicating song names (ornamental data) of respective sets of MIDI data. The connection server then causes the display device 9 of the transmitting terminal to display the samples of electronic mail data, and also display a message area that allows entry of a message (step S22).

Figure 5:
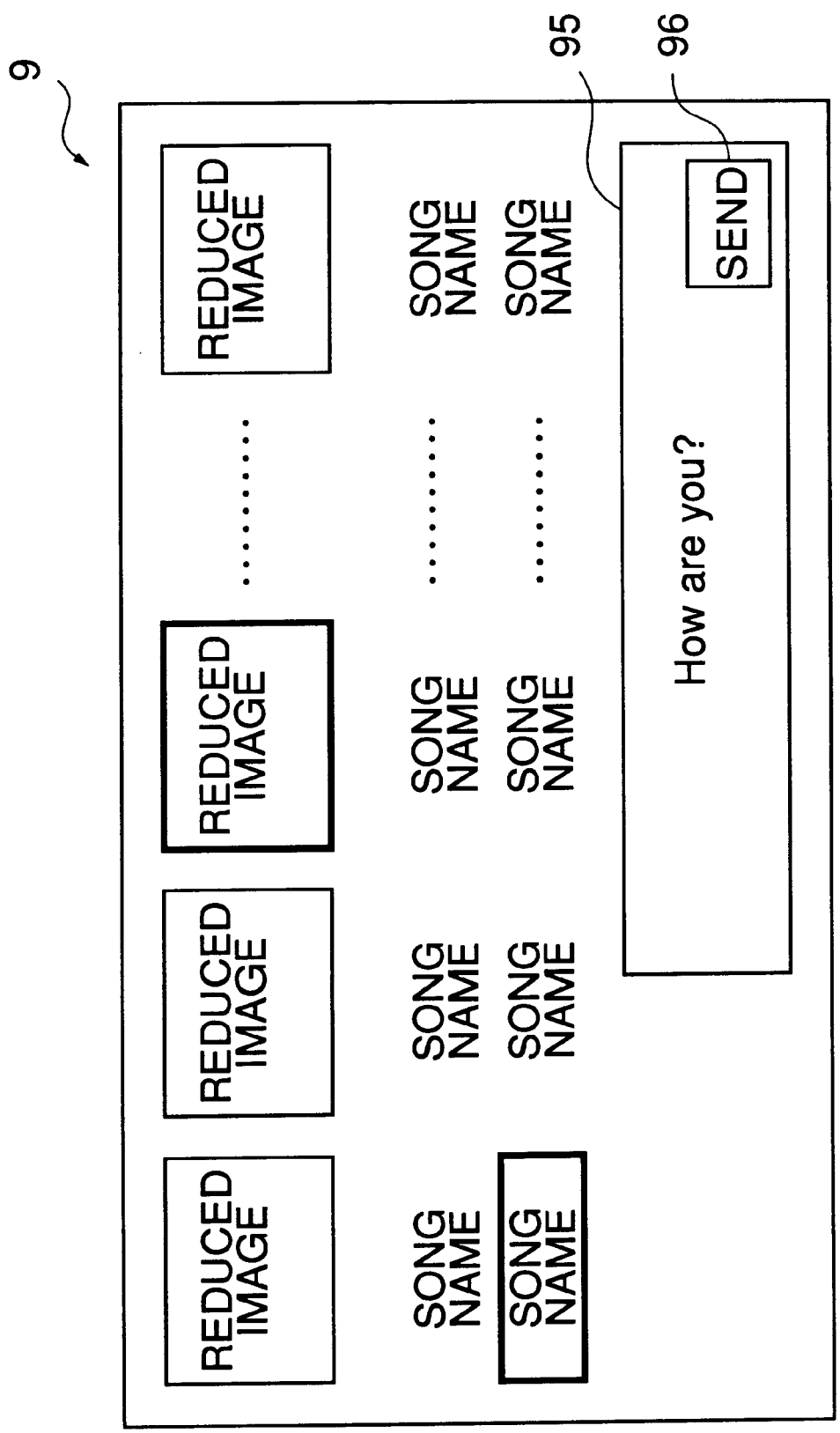
FIG. 5 is a view showing, by way of example, a set of samples of electronic mail data displayed on a display device on the side of the transmitting terminal that constitutes the electronic mail system of the second embodiment.

FIG. 5 shows one example of samples of electronic mail data displayed on the display device 9 on the side of the transmitting terminal. In the example of FIG. 5, a plurality of reduced images of image data and a plurality of song names of MIDI data are displayed, along with a message area 95 (in which the user has already entered a message: "How are you?").

Referring back to FIG. 4, the user selects image data and MIDI data which he/she wishes to send to the receiver, from the plurality of reduced images and song names displayed as shown in FIG. 5, and enters a message in the message area 95 at a step S24. When the user presses a send button 96 (shown in FIG. 5) provided in the message area 95, the transmitting terminal requests the connection server to deliver the electronic mail data including the selected image and song and the message entered by the user, to the desired receiver at a step S25.

In response to the request from the transmitting terminal, the connection server stores the requested electronic mail data (including character data, image data and MIDI data) in a receiver's mail box provided in the storage device at a step S26. The processing steps following the step S26, namely, steps S27 through S35, are similar to the steps S3 through S11 of the first embodiment, and therefore will not be described herein.

In the second embodiment, as described above, song data formed of MIDI data having a small data quantity is attached to the electronic mail, as in the first embodiment. Furthermore, some samples of electronic mail data are available from the connection server, which enables the user to send desired electronic mail data to the receiver, without preparing the electronic mail data, in particular, song data, on his/her own.

In the above described electronic mail systems according to the first and second embodiments, the transmitting terminal and the receiving terminal are each formed by a general purpose computer such as a personal computer and a work station. The transmitting terminal and the receiving terminal are not limited to this type, but they may be implemented by any type of terminals that can be connected to a general purpose network as typically represented by Internet and a satellite communication.

FIG. 6 shows the construction of an electronic mail system according to a third embodiment of the invention. As shown in FIG. 6, the electronic mail system according to this embodiment employs, as a transmitting terminal and a receiving terminal, portable communication terminals as represented by a portable phone and a PHS (personal handyphone system), which have a function of being connected to the server computer 102 as shown in FIG. 1. In FIG. 6, a portable communication terminal 30 on the left side is used as a transmitting terminal, and a portable communication terminal 30' on the right side is used as a receiving terminal. However, this is merely an example, and the portable communication terminals 30, 30' may be identical in construction and function with each other, and may each be used as both a transmitting terminal and a receiving terminal.

FIG. 7 schematically shows the construction of one of the two portable communication terminals 30, 30' shown in FIG. 6. In FIG. 7, the portable communication terminal 30 according to the present embodiment is comprised of a circuit component group 30A which constitutes a general portable terminal (i.e. not a special portable terminal that is able to receive electronic mails to which MIDI data are attached and reproduce the MIDI data), and a circuit component group 30B which implements electronic musical instrument functions (mainly including a function of reproducing the received MIDI data). The two circuit component groups 30A, 30B are connected to each other through a communication I/F. The circuit components of the circuit component groups 30A, 30B are similar or identical to those shown in FIG. 1 and described before, or known ones, description of which is therefore omitted.

Figure 8A:
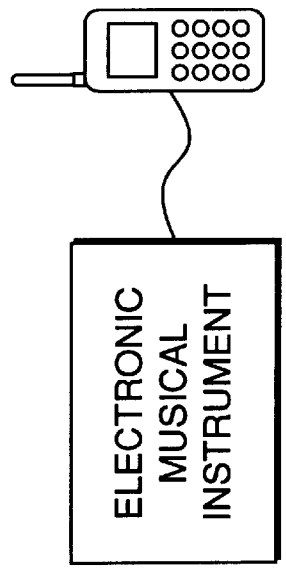
FIG. 8A is a view showing an example of the portable communication terminal.
Figure 8B:
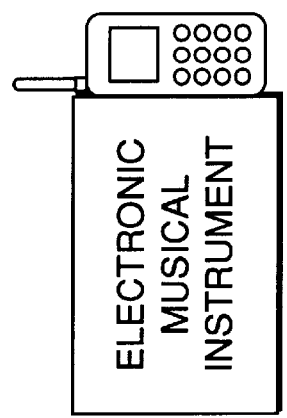
FIG. 8B is a view showing another example of the portable communication terminal.
Figure 8C:
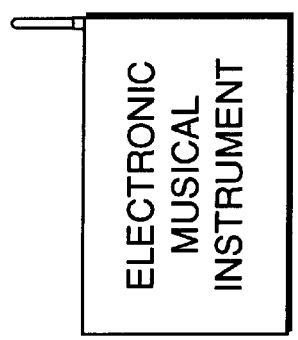
FIG. 8C is a view showing a further example of the portable communication terminal.

Although FIG. 7 shows the construction of a portable communication terminal shown in FIG. 6, that is, the construction of an ordinary portable phone or PHS, in which the entire circuit component group 30A is accommodated, the construction of the portable communication terminal is not limited to this type, but alternatively it may be one of forms shown in FIGS. 8A to 8C. That is, the construction of the portable communication terminal may be a type that an ordinary portable terminal constituted by the circuit component group 30A and a portable musical instrument constituted by the circuit component group 30B are connected to each other by a connection cable, as shown in FIG. 8A, a type that an ordinary portable terminal constituted by the circuit component group 30A and a portable musical instrument constituted by the circuit component group 30B are connected together in a manner being disconnectable from each other by an exclusive connecting mechanism, as shown in FIG. 8B, or a type that the circuit component group 30A is accommodated within a portable musical instrument constituted by the circuit component group 30B, as shown in FIG. 8C. Thus, the portable communication terminal according to the invention may have any construction insofar as the circuit component group 30A and the circuit component group 30B are connected to each other by a communication I/F. The communication I/F may be of any construction insofar as it is adapted to send and receive data of MIDI format between the circuit component group 30A and the circuit component group 30B.

By operating the electronic mail system thus constructed so as to perform control operations as described before with reference to FIG. 2 or FIG. 4, control operations similar or identical to the control operations according to the first or second embodiment can be performed using portable communication terminals in place of a general purpose computer.

Although the portable communication terminals employed by the present embodiment are of a wireless communication type, portable communication terminals according to the present invention are not limited to this type, but they may be of a wire communication type which can be connected to an analog public network, a digital public network (ISDN), or a local area network (LAN).

The object of the present invention may also be attained by supplying a system or apparatus with a storage medium in which a software program that achieves the function of each of the illustrated embodiments is stored, and causing a computer (CPU 5 or MPU) of the system or apparatus to read and execute the program stored in the storage medium.

In this case, the program read out from the storage medium serves by itself to realize the novel function of the present invention, and thus the storage medium storing the program constitutes the present invention.

The storage medium for supplying such a program to the system or apparatus may be in the form of a hard disc mounted in the HDD 11, CD-ROM 21, MO, MD, floppy disk 20, CD-R (CD-Recordable), magnetic tape, nonvolatile memory card, or ROM, for example. Also, the program may be supplied from other MIDI equipment 100, or from the server computer 102 through the communication network 101.

Needless to say, the function of each of the illustrated embodiments may be performed not only by executing the program read by the computer, but also by causing OS (operating system) that is operating on the computer, to perform a part or all of actual operations according to the instructions or commands contained in the program.

Furthermore, the program read out from the storage medium may be written into a memory provided in an expanded board inserted in the computer, or an expanded unit connected to the computer, and a CPU, or the like, provided in the expanded board or expanded unit may perform a part or all of actual operations according to instructions or commands of the program, so as to accomplish the function of each of the illustrated embodiments.

Although in each of the illustrated embodiments the transmitting terminal or receiving terminal uses the tone generator circuit 15 and effect circuit 16 as shown in FIG. 1, to synthesize musical tones and sound the same, based on song data, alternatively, these functions of musical tone synthesization and sounding may be performed by software means (musical tone synthesis means and effect imparting means) which are realized by executing a program such as a musical tone generating program by the CPU.

Further, although in each of the illustrated embodiments an electronic mail to which song data formed of MIDI data is attached is transmitted and received, alternatively, tone color data (waveform data, musical tone parameters, and others) may also be attached to the electronic mail and transmitted together therewith in case that the receiving terminal has no designated tone color data stored in a storage device thereof. Furthermore, a musical tone generating program for generating musical tones having designated tone color may be attached to the electronic mail and transmitted together therewith in case that the receiving terminal does not have the program stored in a storage device thereof. In these cases, the receiving terminal may use the tone color data or the program transmitted together with the electronic mail, if required, while it may decline receiving it if not required.

The present invention is not limited to the above described embodiments, but may be implemented by various combinations of the features of the above described embodiments. Further, many modifications and variations of the invention are possible in the light of the above teachings without departing from the scope of the appended claims.

What is claimed is:

1. A receiving terminal connected to a communication line, for receiving an electronic mail sent by a transmitting terminal connected to the communication line, said receiving terminal comprising:

a receiving device that receives the electronic mail which is sent by the transmitting terminal, and to which song data comprising musical tone control information is attached;

an opening device that opens the received electronic mail; and a reproduction device that automatically reproduces the song data attached to the electronic mail when the electronic mail is opened by said opening device, wherein said transmitting terminal and said receiving terminal each comprise one of a portable communication terminal of a wireless communication type, and a portable communication terminal of a wire communication type, and wherein said transmitting terminal and said receiving terminal each include a circuit component that constitutes a general portable terminal, and a circuit component group having an electronic musical instrument function of reproducing the song data attached to the received electronic mail.

2. A communication terminal connected to a communication line, for receiving an electronic mail sent by a transmitting terminal connected to the communication line, transferring the received electronic mail to a receiving terminal connected to the communication line, and corresponding to an address of the electronic mail, said communication terminal comprising:

a receiving device that receives, from the transmitting terminal, the electronic mail to which song data comprising musical tone control information is attached;

a storage device that stores the received electronic mail to which the song data is attached;

a notifying device that notifies the receiving terminal of receipt of the electronic mail when receiving the electronic mail from the transmitting terminal; and a transfer device that retrieves the electronic mail and the song data attached to the mail form said storage device, and transfers the electronic mail and the song data to the receiving terminal, when the receiving terminal requests receipt of the electronic mail in response to notification by said notifying device, wherein said transmitting terminal and said receiving terminal each comprise one of a portable communication terminal of a wireless communication type, and a portable communication terminal of a wire communication type, and wherein said transmitting terminal and said receiving terminal each include a circuit component that constitutes a general portable terminal, and a circuit component group having an electronic musical instrument function of reproducing the song data attached to the received electronic mail.

3. A communication terminal connected to a communication line, for receiving an electronic mail sent by a transmitting terminal connected to the communication line, transferring the received electronic mail to a receiving terminal connected to the communication line, and corresponding to an address of the electronic mail, said communication terminal comprising:

a first storage device that stores a plurality of kinds of ornamental data that ornament the electronic mail sent by the transmitting terminal, and a plurality of kinds of song data attached to the electronic mail and comprising musical tone control information;

a presenting device that presents said plurality of kinds of ornamental data and said plurality of kinds of song data stored in said first storage device, to the transmitting terminal, so that the transmitting terminal can select a combination of ornamental data and song data from the plurality of kinds of ornamental data and song data, and designates the combination as electronic mail data;

a second storage device that retrieves the electronic mail data from the first storage device and stores the retrieved data to the receiving terminal when the transmitting terminal requests the communication terminal to send the combination of ornamental data and song data selected and designated as the electronic mail data;

a notifying device that notifies the receiving terminal of receipt of the electronic mail when the electronic mail data is stored in said second storage device in response to the request from the transmitting terminal for sending the electronic mail; and a transfer device that retrieves the electronic mail data from said second storage device, and transfers the data to the receiving terminal, when the receiving terminal requests receipt of the electronic mail in response to notification by said notifying device, wherein said transmitting terminal and said receiving terminal each comprise one of a portable communication terminal of a wireless communication type, and a portable communication terminal of a wire communication type, and wherein said transmitting terminal and said receiving terminal each include a circuit component that constitutes a general portable terminal, and a circuit component group having an electronic musical instrument function of reproducing the song data attached to the received electronic mail.

4. A receiving terminal connected to a communication line for receiving an electronic mail sent from a transmitting terminal connected to the communication line, by way of a communication terminal that receives the electronic mail sent from the transmitting terminal and a delivery request requesting delivery of the electronic mail sent from a receiving terminal connected to the communication line and corresponding to an address of the electronic mail, the electronic mail having attached thereto song data comprising musical tone control information, stores the received electronic mail and the song data attached thereto in a storage device, notifies the receiving terminal of the receipt of the electronic mail in response to receipt of the electronic mail, retrieves the electronic mail and the song data attached thereto from said storage device in response to receipt of the delivery request sent from the receiving terminal in response to notification of the receipt of the electronic mail, and transfers the retrieved electronic mail and song data attached thereto to the receiving terminal, the receiving terminal comprising:

a receiving device that receives the electronic mail, the receipt of which is notified by the communication terminal and which is transferred from the communication terminal;

a delivery request transmitting device that transmits the delivery request in response to the notification of the receipt of the electronic mail from the communication terminal;

an opening device that opens the electronic mail transferred from the communication terminal in response to the delivery request; and an automatic reproducing device that enables reproduction control of playback start, stop, fast forward, and rewind of the song data, and that automatically reproduces the song data attached to the electronic mail when the electronic mail is opened by said opening device.

5. A receiving terminal connected to a communication line for receiving an electronic mail sent from a transmitting terminal connected to the communication line, by way of a communication terminal that stores in a first storage device a plurality of kinds of ornamental data that ornament the electronic mail, and a plurality of kinds of song data to be attached to the electronic mail and comprising musical tone control information, presents said plurality of kinds of ornamental data and said plurality of kinds of song data stored in said first storage device, to the transmitting terminal, so that the transmitting terminal that issues a request for sending the electronic mail can select ornamental data and song data from the plurality of kinds of ornamental data and the plurality of kinds of song data, and designate the selected data as electronic mail data, retrieves ornamental data and song data to be attached to the electronic mail from the first storage device and stores the retrieved data together with the electronic mail in a second storage device in response to a request for sending the electronic mail having attached thereto the selected data from the plurality of kinds of ornamental data and the plurality of kinds of song data to the receiving terminal, received from the transmitting terminal, and retrieves the electronic mail, the ornamental data and the song data attached thereto from said second storage device and delivers the retrieved electronic mail, ornamental data and song data attached thereto to the receiving terminal corresponding to an address of the electronic mail in response to a request for delivering the electronic mail, received from the receiving terminal, the receiving terminal comprising:

a delivery requesting device that issues a delivery request requesting receipt of the electronic mail to the communication terminal;

a receiving device that receives the electronic mail delivered from the communication terminal;

an opening device that opens the delivered electronic mail in response to the delivery request; and an automatic producing device that enables reproduction control of playback start, stop, fast forward and rewind of the song data, and that automatically reproduces the song data attached to the electronic mail while displaying the electronic mail and the ornamental data attached thereto, when the electric mail is opened by said opening device.

6. A receiving terminal connected to a communication line for receiving an electronic mail sent from a transmitting terminal connected to the communication line, by way of a communication terminal that stores in a first storage device a plurality of kinds of ornamental data that ornament the electronic mail, and a plurality of kinds of song data to be attached to the electronic mail and comprising musical tone control information, presents said plurality of kinds of ornamental data and said plurality of kinds of song data stored in said first storage device, to the transmitting terminal, so that the transmitting terminal that issues a request for sending the electronic mail can select ornamental data and song data from the plurality of kinds of ornamental data and the plurality of kinds of song data, and designate the selected data as electronic mail data, retrieves ornamental data and song data to be attached to the electronic mail from the first storage device and stores the retrieved data together with the electronic mail in a second storage device in response to a request for sending the electronic mail having attached thereto the selected data from the plurality of kinds of ornamental data and the plurality of kinds of song data to the receiving terminal, received from the transmitting terminal, notifies the receiving terminal of receipt of the electronic mail in response to storing of the electronic mail in said second storage device, and retrieves the electronic mail, ornamental data and song data attached thereto from said second storage device and delivers the retrieved electronic mail, ornamental data and song data attached thereto to the receiving terminal, in response to receipt of a delivery request requesting receipt of the electronic mail from the receiving terminal responsive to said notification, the receiving terminal comprising:

a receiving device that receives the electronic mail, the receipt of which is notified by the communication terminal and which is transferred from the communication terminal;

a delivery request transmitting device that transmits the delivery request in response to the notification of the receipt of the electronic mail from the communication terminal;

an opening device that opens the electronic mail transferred from the communication terminal in response to the delivery request; and an automatic reproduction device that enables reproduction control of playback start, stop, fast forward and rewind of the song data, and that automatically reproduces the song data attached to the electronic mail while displaying the electronic mail and the ornamental data attached thereto, when the electronic mail is opened by said opening device.

7. A receiving terminal control method of controlling a receiving terminal connected to a communication line for receiving an electronic mail sent from a transmitting terminal connected to the communication line, by way of a communication terminal that receives the electronic mail sent from the transmitting terminal and a delivery request requesting delivery of the electronic mail sent from a receiving terminal connected to the communication line and corresponding to an address of the electronic mail, the electronic mail having attached thereto song data comprising musical tone control information, stores the received electronic mail and the song data attached thereto in a storage device, notifies the receiving terminal of the receipt of the electronic mail in response to receipt of the electronic mail, retrieves the electronic mail and the song data attached thereto from said storage device in response to receipt of the delivery request sent from the receiving terminal in response to notification of the receipt of the electronic mail, and transfers the retrieved electronic mail and song data to the receiving terminal, the receiving terminal control method comprising the steps of:

receiving the electronic mail, the receipt of which is notified by the communication terminal and which is transferred from the communication terminal;

transmitting the delivery request in response to the notification of the receipt of the electronic mail from the communication terminal;

opening the electronic mail transferred from the communication terminal in response to the delivery request;

automatically reproducing the song data attached to the electronic mail when the electronic mail is opened by said opening step; and enabling reproduction control of playback start, stop, fast forward and rewind of the song data.

8. A receiving terminal control method of controlling a receiving terminal connected to a communication line for receiving an electronic mail sent from a transmitting terminal connected to the communication line, by way of a communication terminal that stores in a first storage device a plurality of kinds of ornamental data that ornament the electronic mail, and a plurality of kinds of song data to be attached to the electronic mail and comprising musical tone control information, presents said plurality of kinds of ornamental data and said plurality of kinds of song data stored in said first storage device, to the transmitting terminal, so that the transmitting terminal that issues a request for sending the electronic mail can select ornamental data and song data from the plurality of kinds of ornamental data and the plurality of kinds of song data, and designate the selected data as electronic mail data, retrieves ornamental data and song data to be attached to the electronic mail from the first storage device and stores the retrieved data together with the electronic mail in a second storage device in response to a request for sending the electronic mail having attached thereto the selected data from the plurality of kinds of ornamental data and the plurality of kinds of song data to the receiving terminal, received from the transmitting terminal, and retrieves the electronic mail, the ornamental data and the song data attached thereto from said second storage device and delivers the retrieved electronic mail, ornamental data and song data attached thereto to the receiving terminal corresponding to an address of the electronic mail in response to a request for delivering the electronic mail, received from the receiving terminal, the receiving terminal control method comprising the steps of:

issuing a delivery request requesting receipt of the electronic mail to the communication terminal;

receiving the electronic mail delivered from the communication terminal;

opening the delivered electronic mail in response to the delivery request;

automatically reproducing the song data attached to the electronic mail while displaying the electronic mail and the ornamental data attached thereto, when the electronic mail is opened by said opening step; and enabling reproduction control of playback start, stop, fast forward and rewind of the song data.

9. A receiving terminal control method of controlling a receiving terminal connected to a communication line for receiving an electronic mail sent from a transmitting terminal connected to the communication line, by way of a communication terminal that stores in a first storage device a plurality of kinds of ornamental data that ornament the electronic mail, and a plurality of kinds of song data to be attached to the electronic mail and comprising musical tone control information, presents said plurality of kinds of ornamental data and said plurality of kinds of song data stored in said first storage device, to the transmitting terminal, so that the transmitting terminal that issues a request for sending the electronic mail can select ornamental data and song data from the plurality of kinds of ornamental data and the plurality of, kinds of song data, and designate the selected data as electronic mail data, retrieves ornamental data and song data to be attached to the electronic mail from the first storage device and stores the retrieved data together with the electronic mail in a second storage device in response to a request for sending the electronic mail having attached thereto the selected data from the plurality of kinds of ornamental data and the plurality of kinds of song data to the receiving terminal, received from the transmitting terminal, notifies the receiving terminal of receipt of the electronic mail in response to storing of the electronic mail in said second storage device, and retrieves the electronic mail, ornamental data and song data attached thereto from said second storage device and delivers the retrieved electronic mail, ornamental data and song data attached thereto to the receiving terminal, in response to receipt of a delivery request requesting receipt of the electronic mail from the receiving terminal responsive to said notification, the receiving terminal control method comprising the steps of:

receiving the electronic mail, the receipt of which is notified by the communication terminal and which is transferred from the communication terminal;

transmitting the delivery request in response to the notification of the receipt of the electronic mail from the communication terminal;

opening the electronic mail transferred from the communication terminal in response to the delivery request;

automatically reproducing the song data attached to the electronic mail while displaying the electronic mail and the ornamental data attached thereto, when the electronic mail is opened by said opening step; and enabling reproduction control of playback start, stop, fast forward and rewind of the song data.

10. A storage medium that stores a program executable by a computer, the program comprising a receiving terminal control module for controlling a receiving terminal connected to a communication line for receiving an electronic mail sent from a transmitting terminal connected to the communication line, by way of a communication terminal that receives the electronic mail sent from the transmitting terminal and a delivery request requesting delivery of the electronic mail sent from a receiving terminal connected to the communication line and corresponding to an address of the electronic mail, the electronic mail having attached thereto song data comprising musical tone control information, stores the received electronic mail and the song data attached thereto in a storage device, notifies the receiving terminal of the receipt of the electronic mail in response to receipt of the electronic mail, retrieves the electronic mail and the song data attached thereto from said storage device in response to receipt of the delivery request sent from the receiving terminal in response to notification of the receipt of the electronic mail, and transfers the retrieved electronic mail and song data to the receiving terminal, the receiving terminal control module comprising:

a module for receiving the electronic mail, the receipt of which is notified by the communication terminal and which is transferred to the receiving terminal by the communication terminal;

a module for transmitting the delivery request in response to the notification of the receipt of the electronic mail from the communication terminal;

a module for opening the electronic mail transferred from the communication terminal in response to the delivery request;

a module for automatically reproducing the song data attached to the electronic mail when the electronic mail is opened by said opening module; and a module for enabling reproduction control of playback start, stop, fast forward and rewind of the song data.

11. A storage medium that stores a program executable by a computer, the program comprising a receiving terminal control module for controlling a receiving terminal connected to a communication line for receiving an electronic mail sent from a transmitting terminal connected to the communication line, by way of a communication terminal that stores in a first storage device a plurality of kinds of ornamental data that ornament the electronic mail, and a plurality of kinds of song data to be attached to the electronic mail and comprising musical tone control information, presents said plurality of kinds of ornamental data and said plurality of kinds of song data stored in said first storage device, to the transmitting terminal, so that the transmitting terminal that issues a request for sending the electronic mail can select ornamental data and song data from the plurality of kinds of ornamental data and the plurality of kinds of song data, and designate the selected data as electronic mail data, retrieves ornamental data and song data to be attached to the electronic mail from the first storage device and stores the retrieved data together with the electronic mail in a second storage device in response to a request for sending the electronic mail having attached thereto the selected data from the plurality of kinds of ornamental data and the plurality of kinds of song data to the receiving terminal, received from the transmitting terminal, and retrieves the electronic mail, the ornamental data and the song data attached-thereto from said second storage device and delivers the retrieved electronic mail, ornamental data and song data attached thereto to the receiving terminal corresponding to an address of the electronic mail in response to a request for delivering the electronic mail, received from the receiving terminal, the receiving terminal control module comprising:

a module for issuing a delivery request requesting receipt of the electronic mail to the communication terminal;

a module for receiving the electronic mail delivered from the communication terminal;

a module for opening the delivered electronic mail in response to the delivery request;

a module for automatically reproducing the song data attached to the electronic mail while displaying the electronic mail and the ornamental data attached thereto, when the electronic mail is opened by said opening module; and a module for enabling reproduction control of playback start, stop, fast forward and rewind of the song data.

12. A storage medium that stores a program executable by a computer, the program comprising a receiving terminal control module for controlling a receiving terminal connected to a communication line for receiving an electronic mail sent from a transmitting terminal connected to the communication line, by way of a communication terminal that stores in a first storage device a plurality of kinds of ornamental data that ornament the electronic mail, and a plurality of-kinds of song data to be attached to the 24 electronic mail and comprising musical tone control information, presents said plurality of kinds of ornamental data and said plurality of kinds of song data stored in said first storage device, to the transmitting terminal, so that the transmitting terminal that issues a request for sending the electronic mail can select ornamental data and song data from the plurality of kinds of ornamental data and the plurality of kinds of song data, and designate the selected data as electronic mail data, retrieves ornamental data and song data to be attached to the electronic mail from the first storage device and stores the retrieved data together with the electronic mail in a second storage device in response to a request for sending the electronic mail having attached thereto the selected data from the plurality of kinds of ornamental data and the plurality of kinds of song data to the receiving terminal, received from the transmitting terminal, notifies the receiving terminal of receipt of the electronic mail in response to storing of the electronic mail in said second storage device, and retrieves the electronic mail, ornamental data and song data attached thereto from said second storage device and delivers the retrieved electronic mail, ornamental data and song data attached thereto to the receiving terminal, in response to receipt of a delivery request requesting receipt of the electronic mail from the receiving terminal responsive to said notification, the receiving terminal control module comprising:

a module for receiving the electronic mail, the receipt of which is notified by the communication terminal and which is transferred from the communication terminal;

a module for transmitting the delivery request in response to the notification of the receipt of the electronic mail from the communication terminal;

a module for opening the electronic mail transferred from the communication terminal in response to the delivery request;

a module for automatically reproducing the song data attached to the electronic mail while displaying the electronic mail and the ornamental data attached thereto, when the electronic mail is opened by said opening module; and a module for enabling reproduction control of playback start, stop, fast forward and rewind of the song data.

13. A method of receiving an electronic mail using a receiving terminal connected to a communication line, said electronic mail sent by a transmitting terminal connected to the communication line, wherein said transmitting terminal and said receiving terminal each comprise one of general purpose computer, a portable communication terminal of a wireless communication type, and a portable communication terminal of a wire communication type, and wherein said transmitting terminal and said receiving terminal each include a circuit component that constitutes a general portable terminal and a circuit component group having an electronic musical instrument function of reproducing the song data attached to the received electronic mail, said method comprising the steps of:

receiving the electronic mail that is sent by the transmitting terminal, said electronic mail includes song data comprising musical tone control information;

opening the received electronic mail; and reproducing the song data attached to the electronic mail when the electronic mail is opened.

14. A method for receiving an electronic mail sent by a transmitting terminal connected to the communication line and transferring the received electronic mail to a receiving terminal connected to the communication line, wherein said transmitting terminal and said receiving terminal each comprise one of a portable communication terminal of a wireless communication type, and a portable communication terminal of a wire communication type, and wherein said transmitting terminal and said receiving terminal each include a circuit component that constitutes a general portable terminal and a circuit component group having an electronic musical instrument function of reproducing the song data attached to the received electronic mail, said method comprising the steps of:

receiving, from the transmitting terminal, the electronic mail to which song data comprising musical tone control information is attached;

storing the received electronic mail to which the song data is attached;

notifying the receiving terminal of receipt of the electronic mail when receiving the electronic mail from the transmitting terminal;

retrieving the electronic mail and the song data attached to the mail form said storage device; and transferring the electronic mail and the song data to the receiving terminal when the receiving terminal requests receipt of the electronic mail in response to notification by said step of notifying.

15. A method for receiving an electronic mail sent by a transmitting terminal connected to the communication line and for transferring the received electronic mail to a receiving terminal connected to the communication line, wherein said transmitting terminal and said receiving terminal each comprise one of a general purpose computer, a portable communication terminal of a wireless communication type, and a portable communication terminal of a wire communication type, and wherein said transmitting terminal and said receiving terminal each include a circuit component that constitutes a general portable terminal and a circuit component group having an electronic musical instrument function of reproducing the song data attached to the received electronic mail, said method comprising the steps of:

storing in a first storage device a plurality of kinds of ornamental data that ornament the electronic mail sent by the transmitting terminal, and a plurality of kinds of song data attached to the electronic mail and comprising musical tone control information;

presenting to the transmitting terminal said plurality of kinds of ornamental data and said plurality of kinds of song data so that the transmitting terminal can select a combination of ornamental data and song data from the plurality of kinds of ornamental data and song data, and designates the combination as a electronic mail data;

retrieving the electronic mail data from said storage device and storing the retrieved data to a second storage device upon receiving a request from the transmitting terminal to send the electronic mail data;

notifying the receiving terminal of receipt of the electronic mail when the electronic mail data is stored in said second storage device in response to the request from the transmitting terminal for sending the electronic mail; and retrieving the electronic mail data from said second storage device and transferring the data to the receiving terminal when the receiving terminal requests receipt of the electronic mail in response to notification by said step of notifying.

16. A machine readable medium containing a set of executable instructions for causing a processor to perform a method of receiving an electronic mail using a receiving terminal connected to a communication line, said electronic mail sent by a transmitting terminal connected to the communication line, wherein said transmitting terminal and said receiving terminal each comprise one of general purpose computer, a portable communication terminal of a wireless communication type, and a portable communication terminal of a wire communication type, and wherein said transmitting terminal and said receiving terminal each include a circuit component that constitutes a general portable terminal and a circuit component group having an electronic musical instrument function of reproducing the song data attached to the received electronic mail, said method comprising the steps of:

receiving the electronic mail that is sent by the transmitting terminal, said electronic mail includes song data comprising musical tone control information;

opening the received electronic mail; and reproducing the song data attached to the electronic mail when the electronic mail is opened.

17. A machine readable medium containing a set of executable instructions for causing a processor to perform a method for receiving an electronic mail sent by a transmitting terminal connected to the communication line and transferring the received electronic mail to a receiving terminal connected to the communication line, wherein said transmitting terminal and said receiving terminal each comprise one of a portable communication terminal of a wireless communication type, and a portable communication terminal of a wire communication type, and wherein said transmitting terminal and said receiving terminal each include a circuit component that constitutes a general portable terminal and a circuit component group having an electronic musical instrument function of reproducing the song data attached to the received electronic mail, said method comprising the steps of:

receiving, from the transmitting terminal, the electronic mail to which song data comprising musical tone control information is attached;

storing the received electronic mail to which the song data is attached;

notifying the receiving terminal of receipt of the electronic mail when receiving the electronic mail from the transmitting terminal;

retrieving the electronic mail and the song data attached to the mail form said storage device; and transferring the electronic mail and the song data to the receiving terminal when the receiving terminal requests receipt of the electronic mail in response to notification by said step of notifying.

18. A machine readable medium containing a set of executable instructions for causing a processor to perform a method for receiving an electronic mail sent by a transmitting terminal connected to the communication line and for transferring the received electronic mail to a receiving terminal connected to the communication line, wherein said transmitting terminal and said receiving terminal each comprise one of a general purpose computer, a portable communication terminal of a wireless communication type, and a portable communication terminal of a wire communication type, and wherein said transmitting terminal and said receiving terminal each include a circuit component that constitutes a general portable terminal and a circuit component group having an electronic musical instrument function of reproducing the song data attached to the received electronic mail, said method comprising the steps of:

storing in a first storage device a plurality of kinds of ornamental data that ornament the electronic mail sent by the transmitting terminal, and a plurality of kinds of song data attached to the electronic mail and comprising musical tone control information;

presenting to the transmitting terminal said plurality of kinds of ornamental data and said plurality of kinds of song data so that the transmitting terminal can select a combination of ornamental data and song data from the plurality of kinds of ornamental data and song data, and designates the combination as a electronic mail data;

retrieving the electronic mail data from said storage device and storing the retrieved data to a second storage device upon receiving a request from the transmitting terminal to send the electronic mail data;

notifying the receiving terminal of receipt of the electronic mail when the electronic mail data is stored in said second storage device in response to the request from the transmitting terminal for sending the electronic mail; and retrieving the electronic mail data from said second storage device and transferring the data to the receiving terminal when the receiving terminal requests receipt of the electronic mail in response to notification by said step of notifying.

\* \* \* \* \*